United States Patent
Laffey

(10) Patent No.: US 9,444,622 B2
(45) Date of Patent: Sep. 13, 2016

(54) COMPUTING PLATFORM WITH SYSTEM KEY

(75) Inventor: Thomas M. Laffey, Roseville, CA (US)

(73) Assignee: HEWLETT PACKARD ENTERPRISE DEVELOPMENT LP, Houston, TX (US)

(*) Notice: Subject to any disclaimer, the term of this patent is extended or adjusted under 35 U.S.C. 154(b) by 2455 days.

(21) Appl. No.: 12/210,380

(22) Filed: Sep. 15, 2008

(65) Prior Publication Data

US 2010/0067689 A1    Mar. 18, 2010

(51) Int. Cl.
H04L 29/06 (2006.01)
H04L 9/08 (2006.01)

(52) U.S. Cl.
CPC ........... *H04L 9/0877* (2013.01); *H04L 9/0897* (2013.01)

(58) Field of Classification Search
CPC . H04L 63/0428; H04L 63/06; H04L 9/3273; H04L 9/3234; H04L 9/3236; H04L 9/0838
USPC ........................................ 380/44, 45, 46, 47
See application file for complete search history.

(56) References Cited

U.S. PATENT DOCUMENTS

| | | | |
|---|---|---|---|
| 6,170,058 B1 | 1/2001 | Kausik | |
| 6,959,091 B1 | 10/2005 | Sabin | |
| 7,602,911 B2 * | 10/2009 | Hassan et al. | 380/44 |
| 2002/0064279 A1 * | 5/2002 | Uner | 380/44 |
| 2003/0037242 A1 * | 2/2003 | Yasuna et al. | 713/179 |
| 2003/0118189 A1 * | 6/2003 | Ibi | H04L 9/0822 380/277 |
| 2005/0063542 A1 * | 3/2005 | Ryu | 380/259 |
| 2006/0013199 A1 * | 1/2006 | Boora | H04L 47/10 370/352 |
| 2007/0174616 A1 * | 7/2007 | Buer | H04L 63/0428 713/168 |
| 2008/0084998 A1 * | 4/2008 | Kontani | 380/45 |
| 2008/0152151 A1 | 6/2008 | Pourzandi et al. | |
| 2008/0273694 A1 * | 11/2008 | Ebeid | 380/28 |
| 2009/0037721 A1 * | 2/2009 | Fujiwara et al. | 713/2 |
| 2010/0172504 A1 * | 7/2010 | Allen et al. | 380/286 |

FOREIGN PATENT DOCUMENTS

| | | | |
|---|---|---|---|
| WO | WO 99/14881 | * | 3/1999 |
| WO | WO0207861 A2 | | 9/2002 |
| WO | WO03103251 A1 | | 12/2003 |

* cited by examiner

*Primary Examiner* — Harunur Rashid
(74) *Attorney, Agent, or Firm* — Dicke, Billig & Czaja, PLLC

(57) ABSTRACT

A method for installing a system key onto a computing platform is disclosed. A system key generator is installed on the computing platform. The system key generator is activated and generates a system key within the computing platform. The system key is also stored within the computing platform.

13 Claims, 2 Drawing Sheets

COMPUTING PLATFORM WITH SYSTEM KEY

BACKGROUND

Passing secure information or data between two end points often involves at least one cryptographic key. In cryptography, the key is a piece of information, or a parameter, that determines the functional output of a cryptographic algorithm, or cipher. For example, the key is used to encode data and secure the information. A key can also be used to decode the secure information so it can be presented in a usable format, or back to the original state of the information. In other words, a key during encryption specifies the particular transformation of plaintext into a cipher-text and vice versa during decryption. The security of an encryption system often relies on some key being kept a secret. Appropriate and successful key management is a concern in the secure use of cryptographic systems because poor key management can easily compromise security even with strong encryption algorithms.

In many examples, successful key management involves the use of a key wrapping key. Key wrapping keys can also be referred to as system keys, key encryption keys, or the like. Key wrapping keys are used to encrypt other keys using key algorithms. These other keys can be used to provide specific functions during cryptographic traffic. The other keys can be referred to as user keys, and can include various types of keys such as data encryption keys, authentication keys, access keys, or the like. For example, key wrapping keys encrypt user keys that are used during encryption of plaintext into a cipher-text, and key wrapping keys are used to encrypt user keys that are used during decryption.

Many network devices that require passwords for access and operation are manufactured to include key wrapping keys to later generate a set of user keys. In one common and very straightforward manufacturing process, a manufacturing device will generate a key wrapping key and then install that key into every computing platform (such as a network device) that is being manufactured. The resulting computing platforms are vulnerable in that if one device is compromised, an attacker can use the discovered key wrapping key on the other devices of that type. A more secure method is to direct the manufacturing device to generate and assign a different key wrapping key for each computing platform manufactured. One advantage to this method is if one device is compromised, the discovered key wrapping key would be unlikely to apply to any other device. An ambitious attacker, however, could attack the manufacturing device to determine the key wrapping keys for the manufactured computing platforms.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

Figure 1:
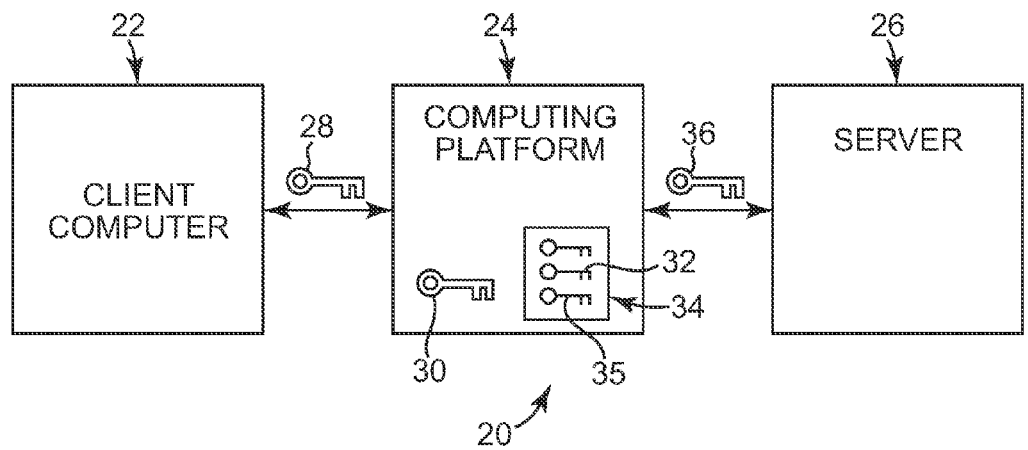
FIG. 1 is schematic drawing of an example environment of the present disclosure.

FIG. 1 illustrates a simplified example of network environment, such as a computer network 20 that can use a system key (key wrapping key) to encrypt and decrypt user keys to send cryptographic traffic on the network. FIG. 1 illustrates a client computer 22 as one endpoint connected to a network switch 24 that is connected to a server 26 as another endpoint. The client computer 22 would like to establish a secure connection with the server 26, and therefore provides a password to access the server.

A network administrator initially configures the network switch, or other computing platform, 24 to encrypt network traffic to each connected device using a unique encryption and decryption-key. When the client computer 22 is connected to the network 20, the client computer 22 performs a key exchange with the network switch 24. In order to perform the exchange using the key configured by the administrator, the switch 24 retrieves an encrypted encryption key 32 (a user key) from its key database 34. The user key 32 is then decrypted using key 30, forming key 28, which is used for all network traffic exchanged with the client computer 22.

The network administrator has similarly configured the network switch 24 to encrypt network traffic transmitted or received from the server computer 26. When a network connection is established between the network switch 24 and the server 26, the switch 24 retrieves another user key, i.e. encryption key 35 from its database. Key 35 is then decrypted using system key 30 to form key 36 which is then used for all traffic exchanged between the network switch 24 and the server 26.

When the client computer 22 would like to establish a secure connection with the server 26, it provides a password to access the server 26. When the password is in transit from the client computer 22 to the network switch 24, it is encrypted using key 28. When the password is in transit from the network switch 24 to the server 26, the password is encrypted with key 36. An example of this scheme is known in the art as MACSec. Secure storage of the keys used by MACSec prevent an attacker from gaining access to the key used for a link, thus preventing the attacker from decrypting the traffic and learning, for instance, the password used by the owner of client 22 to access server 26.

In this example, the network switch 24 is one kind of computing platform, which is used here as a device with a processor and is used to transmit, receive, or pass through cryptographic traffic or establish a secure network connection. The network device 24 is a computing platform in that can include a processor and a storage medium in addition to or used to provide network switching functions. The processor can be dedicated to perform only a specific application or applications or it can be a general purpose processor. Other types of computing platforms are known and contemplated.

Figure 2:
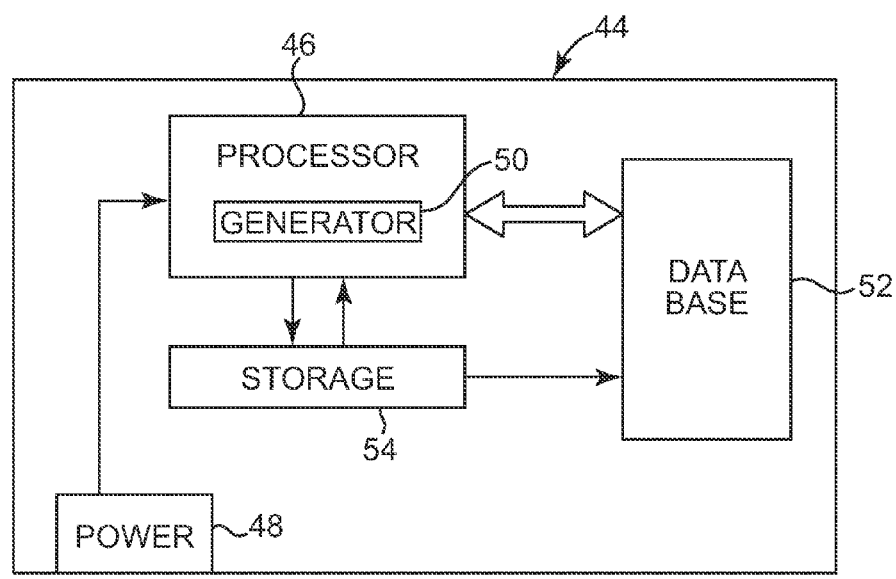
FIG. 2 is a block diagram of an example computing platform.

FIG. 2 illustrates an example computing platform 44 constructed in accordance with the preset disclosure. The computing platform 44 includes a processor 46 operably coupled to a power source 48 and also operably coupled to an encryption algorithm 50 on the computing platform. The processor 46 and encryption algorithm are suitable to generate a system key that can be used to encrypt and decrypt at least one user key. The processor 44 is also operably coupled to a storage entity such as a database 52 suitable for storing the at least one user key, and to another storage entity 54 suitable for storing the system key. Storage entity 54 can be operably coupled to the database 52.

During operation, the processor 46 is configured to generate at least one system key with the encryption algorithm 50. The system key can be stored in storage entity 54. The system key can be retrieved by the processor 46 to generate and encrypt one or more user keys that can be stored in the database 52. The system key is also used to decrypt its generated user keys stored in the database 52.

The example indicates that the computing platform 44 is a single device. In one example, the computing platform can be a single device located within a single case, or it can be a device that can be coupled to a network device. In other examples, the components of the computing platform 44 are physically separated as at least two sub-devices.

The power source can be located on board of the computing platform or include a coupling device to connect the power source to an external power generator. In one example, the power source includes a power supply that receives power from an external source such as a wall outlet. The power supply can be used to provide power to all or almost the entire computing platform. For example, a long-life battery can be used to power the storage entity 54 used to store the system key. The remaining hardware can be powered with the power supply.

The database 52 and storage entity 54 can be configured from any of storage medium, whether part of an existing component or dedicated to store the database 52 and system key. The database 52 and storage entity 54 can be included on the same medium or on two or more separate mediums. The user keys are encrypted with the system key, so the database 52 with the encrypted user keys can be stored on a less secure medium and even a removable device. In the example, the storage entity 54 storing the system key retains data when power is removed from the system.

Figure 3:
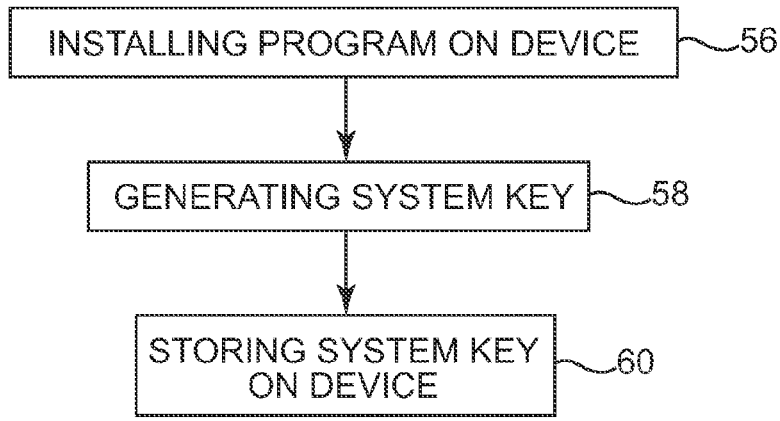
FIG. 3 is flow diagram of an example process for installing a system key.

FIG. 3 illustrates an example method for installing a system key onto the computing platform. A system key generator is installed on the computing platform 56. The system key generator is activated and generates a system key within the computing platform 58. The system key is also stored within the computing platform 60.

The system key generator 50 in one example includes a symmetric key algorithm. The generator can use a suitable cryptographic algorithm where the generated keys are both random and contain sufficient entropy. Some operating systems or generators include tools for "collecting" entropy from the timing of unpredictable operations such as disk drive head movements. An example of a symmetric key algorithm includes both encryption and decryption capabilities. Several algorithms are known, such as DES (Data Encryption Standard), 3DES (generally a block cipher formed from using DES cipher three times), and AES (Advanced Encryption Standard) or Rijndael. It is contemplated that other ciphers can be used that are available now or developed after this disclosure.

The system key generator 50 can be installed into the computing platform 44 in a number of ways. For example, the system key generator 50 can be configured from a hardware component dedicated to generating the system key, a software code operating on a general purpose processor in the computing platform 44, or any combination of the two. The system key generator 50 can be included onto the computing platform 44 with the other components during manufacture or at any time later, such as with a firmware installation or update.

The system key generator 50 can be activated to generate a system key upon receiving a Generate_System_Key command. In one example, this command is used once and then purged. In one example, the system key generator is activated during manufacture of the computing platform 44. For example, the system key generator can be activated during testing of the computing platform. Other examples include generating the system key at some other time, such as after power up after the computing platform has been cleared in testing, such as at initial power up.

In a preferred example, the system key storage 54 is local on the computing platform 44. System key storage memory can take many forms, and can retain data even when power is removed from the computing platform. In one example, the memory is non-volatile, and is powered with the power supply of the computing platform. In another example, the memory is volatile and is powered with a battery. The location of the memory 50 can vary. For examples, in some implementations the memory can be within the same chip package as the processor. In some examples, the storage entity of the system key is hidden. For example, parts of the system key can be scattered in different memory locations or at different addresses to make the system difficult to physically locate if the system was compromised.

Figure 4:
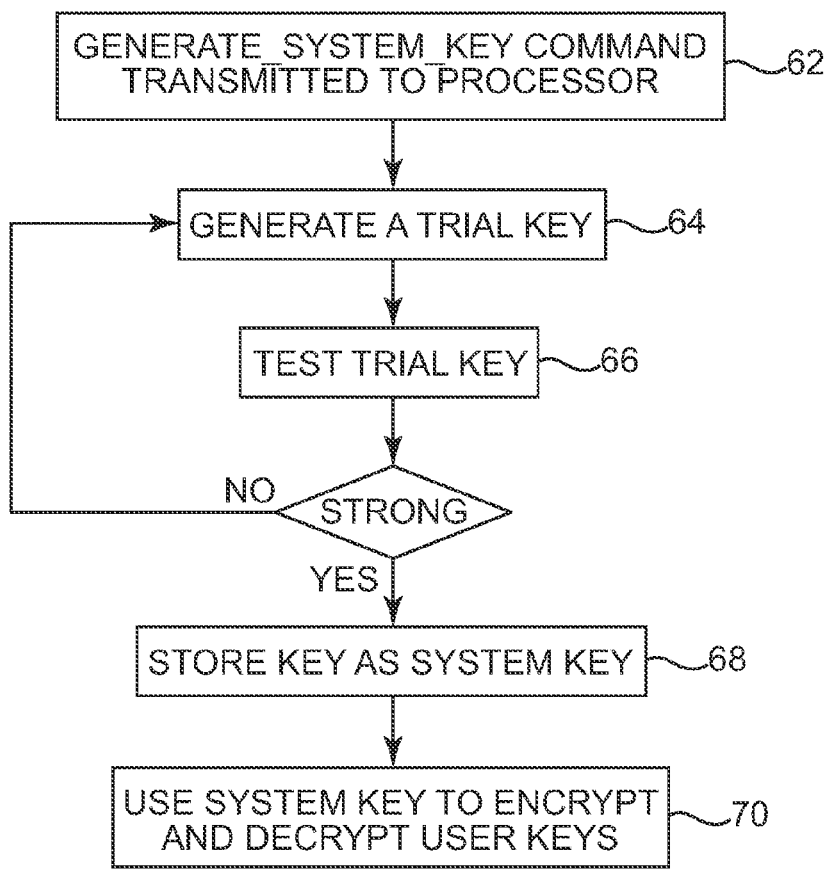
FIG. 4 is a flow diagram of another example for installing a system key.

FIG. 4 illustrates another example method for installing a system key onto the computing platform. A Generate_System_Key command is transmitted to the processor 46, which runs a key generation algorithm, or cryptographic algorithm, at the time of initial power provided to the computing platform, such as at first testing 62. The location of the program and the method of command transmission can each vary depending on implementation. The processor generates a trial key using random numbers or a sequence of random numbers 64. The method of determining random numbers and the program for generating the random numbers can each vary by implementation. Using cryptographic procedures, the processor tests the trial key for cryptographic quality 66. These cryptographic procedures are now known or can be later developed. After the cryptographic algorithm selects a sufficiently strong key, the processor stores the key in a local key storage memory 68. Further operations to store or retrieve a user key for cryptographic operations use this stored key, i.e., the system key, to encrypt or decrypt the user key 70.

Various security options are possible. Some implementations benefit from the added security of generating more than one system keys, each assigned to a different set of user keys or user key. Further security can be realized if the system key is not transmitted from the processor to any other chip or storage location. This helps prevent the possibility of capture or recording of the key during this transmission. A high security and lower security example implementations of some of the system key generation and storage examples are discussed below.

Several features are desirable in an example high security implementation of the system key generation. One example includes that the devices used by the processor performing the cryptographic algorithm are internal to the chip that includes the processor. This can include random access memory (RAM) required to execute the key generation algorithm, which can be the most secure symmetric encryption method available. Also, the Generate_System_Key command can be transmitted over a single-purpose link for the manufacturing test system to the newly manufactured computing platform. The key generation can be stored in and executed from a read only memory (ROM) internal to the processor that performs the cryptographic algorithm. Also, hardware can be used to generate the random numbers, which accelerates the generation of random number and can provide for greater key randomness than a non-hardware or software approach pseudo random number generator. In a high security implementation, the processor performing the cryptographic operations does not include a bus exposed externally to the chip containing the processor. Further, the system can be configured so that no debug information is available regarding the processor or internal data bus during the operation of the cryptographic algorithm or any other crypto graphic function. The cryptographic algorithm can disable debugging capability including JTAG, Embedded Trace (ETM), or other hardware or software assisted debugging mechanism. Still further, the system key generator can be removed from the computing platform after generating the system key, such as by erasing the generator or overwriting the generator.

Several features are desirable in an example high security implementation of the system key storage. These features can include that key storage memory location is local to, such as on the same internal bus, as the processor performing the cryptographic algorithm. Another desirable feature is a system to detect attacks on the computing platform. Examples of types of attack detection are known and can include a detector to determine a physical intrusion of all or parts of the computing platform. Another example of a detector is one that can determine environmental anomalies such as high or temperature, and the like. In the case of an attack, the system key storage can be erased or "zeroed."

An example of this is to connect the system key storage to a battery and the attack detector. If the main power supply is off, such as the computing platform is unplugged, the erasing function can still be powered with the battery. Upon a detection of an attack, the battery can operate the erasing function of the memory and erase or zero the system key form memory.

A lower security implementation need not contain some or all of the above-described features of the high security system. Instead, the lower security implementation uses operation security of the computing platform manufacturing process and on control over the physical access of the processor performing the cryptographic algorithm. Operational security includes that no program facility be provided that is capable of transmitting either the system key or decrypted user keys to another location outside of the computing platform. Operational security can also include the ability to keep the encryption algorithm unaltered over time and that it is verified not to transmit generated keys to locations outside of their intended storage locations.

Some specific examples of the lower security implementation are described. For example, the low security implementation can be used on nearly any embedded system because it need not make use of security-specific hardware. The cryptographic algorithm software can be loaded with the rest of the software for the computing platform. Also, communication between the test system and the newly manufactured computing platform is not restricted and can be provided on any existing link. Further, the program processing the Generate_System_Key command can be temporarily stored in a general storage location and can execute from the same location as the normal production programs of the computing platform. Still further, the cryptographic algorithm can be replaced with a normal production program once the system keys have been generation. This can employ an existing initial program loading process.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method for installing a system key on a computing platform, comprising:
    installing a system key generator on the computing platform;
    generating the system key within the computing platform with the system key generator;
    storing the system key within the computing platform;
    preventing a transmission of the system key to a location outside of the computing platform; and
    in response to detecting an attack on the computing platform, erasing the system key from the computing platform,
    wherein storing the system key includes hiding the system key within the computing platform by storing the system key as a plurality of scattered key components in different locations within the computing platform.

2. The method of claim 1, further comprising removing the system key generator from the computing platform after generating the system key.

3. The method of claim 1 wherein installing the system key generator includes providing the computing platform with a software program into a component of the computing platform.

4. The method of claim 3 wherein providing the software program includes providing the software program as a firmware update.

5. The method of claim 1 wherein generating the system key occurs during manufacturing of the computer platform.

6. The method of claim 5 wherein generating the system key occurs during testing of the computer platform.

7. The method of claim 1 wherein the computing platform is a network switch.

8. The method of claim 1 wherein generating a system key includes generating a plurality of system keys.

9. A method for installing a system key on a computing platform, comprising:
- generating a trial key with a key generation algorithm local to the computing platform;
- testing the trial key for cryptographic quality to select the system key;
- storing the selected system key locally on the computing platform;
- preventing a transmission of the system key to a location outside of the computing platform;
- encrypting and decrypting user keys on the computing platform with the system key; and
- in response to detecting an attack on the computing platform, erasing the system key from the computing platform,
- wherein storing the selected system key includes hiding the selected system key within the computing platform by storing the selected system key as a plurality of scattered key components in different locations within the computing platform.

10. The method of claim 9, further comprising commanding a key generation algorithm to begin generating the trial key.

11. The method of claim 9 wherein generating the trial key includes using a random number generator on the computing platform to generate a random number or a sequence of random numbers.

12. The method of claim 11 wherein the random number generator is a hardware random number generator or a pseudo random number generator.

13. The method of claim 1, wherein detecting the attack comprises at least one of:
- detecting a physical intrusion of the computing platform, and
- detecting environmental anomalies.

* * * * *